G. H. STALLMAN.
Inlet Pipe for Street-Sprinkler.
No. 204,172. Patented May 28, 1878.
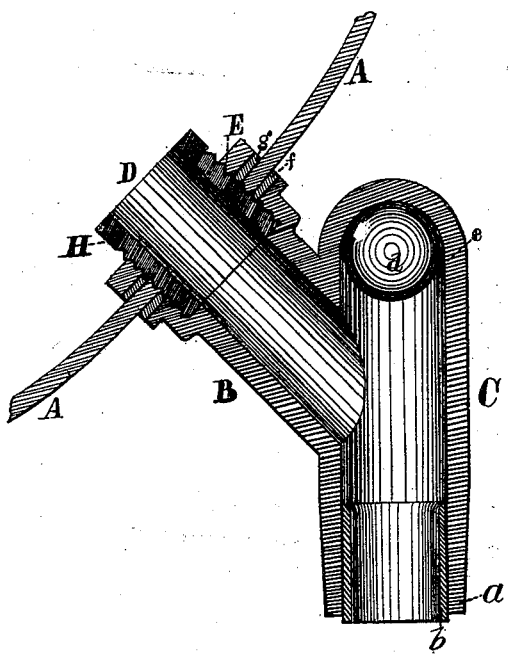

UNITED STATES PATENT OFFICE.

GRANVILLE H. STALLMAN, OF CINCINNATI, OHIO, ASSIGNOR OF ONE-HALF HIS RIGHT TO MATTHEW BRAAM, OF SAME PLACE.

IMPROVEMENT IN INLET-PIPES FOR STREET-SPRINKLERS.

Specification forming part of Letters Patent No. 204,172, dated May 28, 1878; application filed February 23, 1878.

*To all whom it may concern:*

Be it known that I, GRANVILLE H. STALLMAN, of the city of Cincinnati, in the county of Hamilton and State of Ohio, have invented certain new and useful Improvements in Inlet-Pipes for Filling Vessels Employed for Sprinkling, of which the following is a specification:

The first part of my invention consists in the novel configuration of the inlet-pipe, whereby that portion of the pipe to which the hose for supplying the vessel with water is connected is placed in a vertical position. The hose, when connected to the pipe, hangs perpendicularly from the latter, and thus any tendency of the hose to break or split, as is the case where the hose is attached to the mouth of a pipe extending horizontally, or nearly so, is obviated.

The second part of my invention consists in combining a valve with the inlet-pipe aforementioned, in such a manner that the valve shall be outside of the vessel containing the water for sprinkling and close to the mouth of the inlet-pipe.

In an inlet-pipe where the valve is in the inner end—that is, in that end which is in the vessel—whenever the flow of water through this pipe is stopped, and the pressure of water closes the valve at the inner end of the pipe, there will remain a long column of water in the pipe, which, on the removal of the hose, gushes out and wets the driver and cuts up the street. This portion of my invention prevents the exit of this column of water, and therefore obviates the disadvantages with which it is attended. Frequently sticks or other material get stuck in the pipe at the point where the valve is located. Where the valve is within the vessel it is almost impossible to clean the valve. My invention enables the valve to be readily reached and the obstruction removed.

The third portion of my invention consists in an improved mode of securing the inlet-pipe in the shell of the vessel, whereby facility in attaching the inlet-pipe to the said shell and security from leakage are obtained.

The figure of the accompanying drawing is a vertical section of my invention, showing the application thereof to the shell of the vessel.

A indicates a portion of the shell of the vessel for containing the water with which the street, road, or other locality is to be sprinkled. This vessel may be of any desired shape. The shape of the vessel here shown is cylindrical. B designates the stem of the inlet-pipe, and C the vertical portion of same. The exterior surface of mouth *a* of pipe C is smooth, as shown, so as to allow the end of the hose which supplies the water to be drawn over it. This exterior surface is preferably tapered downward, so as to tighten the grasp of the hose thereon as it is drawn upward over the mouth. The interior of the mouth is provided with an annular seat, *b*, which constitutes the valve-seat of the ball-valve *d*, here seen in the recess at the top of pipe C. The bore of pipe C is somewhat greater in diameter than the bore of stem B, in order to prevent the ball-valve from entering said stem.

My improved devices for connecting the stem B to the vessel are as follows, viz: A tube, D, having all or the greater portion of its perimeter provided with a screw-thread, is made of a proper size to engage a female screw in the end of stem B.

In attaching the inlet-pipe to the vessel, the lock-nut E is first screwed onto the tube D and left on the inner end of the screw-thread. Washer *g* is placed on the tube against that side of the lock-nut which is next to the shell.

The tube D is introduced within the vessel and screwed into and through the shell A, so that a portion of the tube projects beyond each side of the shell. A washer, *f*, is then placed on the outer end of the tube and next to the shell, and the stem B is then screwed onto that end of the tube, and presses said washer against the shell, care being taken that the pipe C shall remain in a vertical position. Lock-nut E is then screwed up, and presses the washer *g* against the shell. As here shown, the portion H of tube D is preferably left without a thread, in order to afford a place where tongs can be applied to screw the tube into the shell, and without injuring the screw-thread thereon. When the portion H is omitted, the lock-nut E and washer *g* can be screwed onto the tank from the inside after the tube D has been screwed into the shell.

Other modes of connecting the stem D to the shell A may be employed; but I prefer the improved mode herein described, as it facilitates the attachment of the pipe to the shell, makes a firm and strong connection, and well prevents leakage of the water within the shell through the point where the said connection is made.

In operating my invention, the hose for supplying the vessel is drawn over the mouth a, and, water being allowed to pass through the hose, the valve d is lifted from seat b and forced into recess e, as shown in the figure of the drawing. The water then passes into the vessel. When the supply of water through the hose is stopped, gravity returns the ball d to its seat b, and prevents the exit of water from the vessel and inlet-pipe.

The particular configuration of my inlet-pipe is of value irrespective of the particular description of valve employed. The style of valve may be varied without altering or impairing the value of this feature of my invention. In case a flap-valve were placed in the mouth a, the recess e would be dispensed with. I prefer, however, to employ the ball-valve, as its action is very certain and effective.

When preferred, a screw-thread or equivalent device for coupling the hose to the inlet-pipe may be worked on or attached to the exterior of mouth a. The shape of the vessel may render it desirable to place the stem B at right angles to the mouth a. The device so constructed is within the scope of the first part of my invention.

What I claim as my invention is—

1. An inlet-pipe for a sprinkling apparatus, consisting of stem B and vertical mouth a and a valve located at or near the orifice of said mouth, for the purposes specified.

2. The inlet-pipe for a sprinkling apparatus, consisting of stem B, vertical portion C, provided with recess e, ball-valve d, and valve-seat b, substantially as and for the purposes specified.

3. In combination with stem B, provided with mouth-piece a, the tube D, substantially as and for the purposes specified.

4. In combination with stem B, provided with mouth-piece a, the tube D and lock-nut E, substantially as and for the purposes specified.

5. In combination, the vertical portion C, ball-valve d, valve-seat stem B, tube D, and lock-nut E, substantially as and for the purposes specified.

Cincinnati, February 21, 1878.

GRANVILLE H. STALLMAN.

Attest:
W. S. CHRISTOPHER,
JNO. W. STREHLI.